United States Patent Office 3,796,749
Patented Mar. 12, 1974

3,796,749
PROCESS FOR PRODUCING AMINO METHYLENE PHOSPHONIC ACIDS
Friedrich Krueger, 27 Erzbergerstrasse, 6803 Edingen, Germany; Lieselotte Bauer, 62A Seebacher Strasse, 6702 Bad Duerkheim, Germany; and Walter Michel, 67 Neue Schulstrasse, 6804 Ilvesheim, Germany
No Drawing. Continuation-in-part of application Ser. No. 125,857, Mar. 18, 1971. This application May 19, 1972, Ser. No. 255,022
Int. Cl. C07f 9/38
U.S. Cl. 260—502.5                    14 Claims

ABSTRACT OF THE DISCLOSURE

The improved process of producing substantially pure amino methylene phosphonic acids in a high yield comprises reacting N-substituted α-amino mono- or polycarboxylic acids or their alkali metal salts with phosphorous acid in the presence of water-binding agents at a temperature between about 90° C. and about 160° C.

CROSS-REFERENCE TO RELATED APPLICATION

The present application is a continuation-in-part of copending application Ser. No. 125,857, filed Mar. 18, 1971, and entitled "Process of Producing Amino Methylene Phosphonic Acids."

BACKGROUND OF THE INVENTION

(1) Field of the invention

The present invention relates to an improved process of producing amino alkylene phosphonic acids and more particularly to a process of producing substantially pure, crystalline amino methylene phosphonic acids in a high yield.

(2) Description of the prior art

Copending application Ser. No. 125,857 relates to an improved process of producing substantially pure, crystalline amino methylene phosphonic acids in a high yield substantially without the formation of oily by-products. This process comprises reacting α-amino mono- and polycarboxylic acids which are substituted at their nitrogen atom or, respectively, their alkali metal salts with phosphorous acid and/or a phosphorus trihalogenide, preferably phosphorus trichloride in the presence or absence of an inert solvent. In said process the molar amount of the phosphorous compound is between 1 mole and 3 moles for each carboxyl group present in the α-amino mono- or polycarboxylic acid.

(a) When using phosphorous acid as the phosphorus reactant the reaction is carried out in the absence of an inert solvent at a temperature between about 130° C. and about 160° C. while (b) When using phosphorus trichloride either alone or together with phosphorous acid as phosphorous reactant, the reaction is carried out in the presence or absence of an inert solvent and the reaction mixture is subsequently decomposed with water.

The yield of amino methylene phosphonic acid varies and in general does not exceed about 80%.

SUMMARY OF THE INVENTION

It is one object of the present invention to provide a simple and improved process of producing substantially pure, crystalline amino methylene phosphonic acids in an almost quantitative yield.

Other objects of the present invention and advantageous features thereof will become apparent as the description proceeds.

In principle the improved process of producing amino methylene phosphonic acids comprises reacting α-amino mono- and polycarboxylic acids which are substituted at their nitrogen atom or, respectively, their alkali metal salts with phosphorous acid in the presence of organic and/or inorganic water-binding agents at a temperature between about 90° C. and about 160° C. and preferably at a temperature between about 120° C. and about 140° C. Thereby, the yield of amino methylene phosphonic acid is considerably increased and is almost quantitative.

α-Amino mono- or polycarboxylic acids useful as the one reactant are, for instance, ethylene diamino tetraacetic acid, nitrilo triacetic acid, glycine bis-(methylene phosphonic acid), sarcosine monomethylene phosphonic acid, and others.

According to the process of this invention a reaction takes place between the carboxyl group of the one reactant and the phosphorous acid reactant whereby the carboxyl group is replaced by a phosphonic acid group. For instance, the reaction between ethylene diamino tetraacetic acid and phosphorous acid proceeds according to the following equation whereby ethylene diamino tetra-(methylene phosphonic acid) is produced:

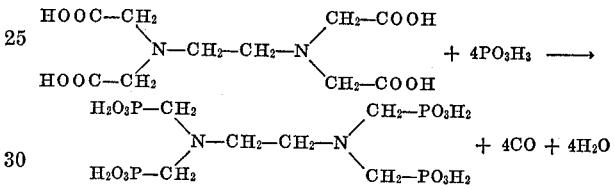

Nitrilo triacetic acid or glycine bis-(methylene phosphonic acid) yield nitrilo tris-(methylene phosphonic acid).

Suitable water-binding agents are acid anhydrides which, by combination with water, are converted into the corresponding acids. Such agents are, for instance, lower alkanoic acid anhydrides such as acetic acid anhydride, propionic acid anhydride, or inorganic acid anhydrides such as phosphorus pentoxide, and the like. Agents which are capable of absorbing water such as concentrated sulfuric acid and the like have also proved to be useful for the purpose of the present invention. Mixtures of such water-binding agents can, of course, also be used.

It is understood, of course, that the water-binding agent must not in any way affect the resulting amino methylene phosphonic acid or, respectively, react therewith.

The amounts of water-binding agent added to the reaction mixture must be sufficient to completely bind and/or combine with the water set free during the reaction or present in the reaction mixture. Thus at least stoichiometric amounts thereof are added. Preferably, however, a twofold to threefold excess of the water-binding agent is used.

For carrying out the process according to the present invention, the preferred procedure consists in first heating the phosphorous acid to a temperature above 90° C. and advantageously to a temperature between about 110° C. and about 130° C. The respective amino carboxylic acid is added to the molten phosphorous acid while stirring, and the water-binding agent is then slowly added to the stirred reaction mixture. During addition there is formed temporarily due to the development of carbon monoxide a foam-like mixture which is transformed by thorough stirring into a suspension of fine granular particles on further addition of the water-binding agent. After its addition is completed, stirring of the reaction mixture is continued at a temperature between about 90° C. and about 160° C. and preferably between about 120° C. and about 140° C. for one to two hours. The reaction mixture is allowed to cool and the resulting crystallized amino methylene phosphonic acid is filtered off by suction and dried. The yield exceeds 95% of the theoretical yield.

DESCRIPTION OF THE PREFERRED EMBODIMENT

The following examples serve to illustrate the present invention without, however, limiting the same thereto.

EXAMPLE 1

270 g. (3.3 moles) of phosphorous acid are stirred at 130° C. (temperature within the acid) for one hour. 191 g. (1 mole) of nitrilo triacetic acid are added portion by portion thereto within 30 minutes while stirring vigorously. Temporarily foam formation takes place and the volume of the reaction mixture increases at the most by about 100%. Stirring of the mixture is continued at 130° C. for 30 minutes. Thereafter 600 cc. of acetic acid anhydride are added thereto slowly and gradually within 45 minutes while stirring vigorously. After about half of the acetic acid anhydride has been added, the contents of the reaction vessel form a lumpy mass which disintegrates after about five minutes when additional acetic acid anhydride is added. Finally a fine-grained suspension is produced. The resulting reaction mixture is stirred at 130° C. for one to two more hours. After cooling, the nitrilo tris-(methylene phosphonic acid) is filtered off by suction and is dried at about 120° C. Yield: 295 g. (theoretical yield: 299 g.).

EXAMPLE 2

370 g. (4.5 moles) of phosphorous acid are stirred at 130° C. for one hour. Thereafter, 292 g. (1 mole) of ethylene diamino tetraacetic acid are added portion by portion thereto within 30 minutes while stirring vigorously. Stirring is continued at 120–130° C. for 10 more minutes. Thereafter, 800 cc. of acetic acid anhydride are added drop by drop thereto within 45 minutes. After the addition of about two third of the anhydride the contents of the reaction vessel form a lumpy mass. On further addition of the anhydride said lumpy mass disintegrates after about 5 minutes and a suspension of fine granular particles is formed. Stirring of the reaction mixture is continued at 130° C. for one to two more hours. After cooling, the resulting ethylene diamino tetra-(methylene phosphonic acid) is filtered off by suction and is dried at 100° C. Yield: 420 g. (theoretical yield: 436 g.).

EXAMPLE 3

270 g. (3.3 moles) of phosphorous acid are stirred at 130° C. for one hour. 191 g. (1 mole) of nitrilo triacetic acid are added portion by portion thereto within 30 minutes while stirring vigorously. Stirring is continued at 130–140° C. for 45 more minutes. Thereafter, 300 g. of phosphorus pentoxide are added portion by portion within one hour while stirring vigorously. Thereby, the volume of the reaction mixture increases at the most to 100% by the formation of foam. Stirring is continued at 130° C. for one to two more hours. A dark brown sirup is obtained which solidifies to a mass which is hard as stone. Therefore, the sirup while still hot is diluted with water to yield a 25% solution of the phosphonic acid. A clear, brownish solution of nitrilo tris-(methylene phosphonic acid) is obtained which can be used as such. Yield: 1196 g. of the 25% solution.

The nitrilo tris-(methylene phosphonic acid) is obtained in solid form by diluting the hot sirup with water to yield a solution containing 50% of water. On allowing the mixture to stand overnight, nitrilo tris-(methylene phosphonic acid) crystallizes in a yield exceeding 95%.

EXAMPLE 4

270 g. (3.3 moles) of phosphorous acid and 191 g. (1 mole) of nitrilo triacetic acid are heated to 130° C. (temperature of the mixture) while stirring. Heating is continued at said temperature for 30 more minutes. Thereafter, 600 cc. of acetic acid anhydride are added gradually thereto within about 45 minutes. Heating of the resulting reaction mixture at 130° C. is continued for two hours. After cooling, the resulting nitrilo tris-(methylene phosphonic acid) is filtered off by suction and is dried at about 120° C. Yield: 290 g.

EXAMPLE 5

270 g. (3.3 moles) of phosphorous acid, 191 g. (1 mole) of nitrilo triacetic acid, and 300 g. of phosphorus pentoxide are mixed at room temperature. The mixture is heated to 130–140° C. while stirring vigorously. Heating at 130° C. is continued for one hour. The resulting hot sirup is diluted with water so as to yield a solution containing 50% of water. On cooling, nitrilo tris-(methylene phosphonic acid) crystallizes. Yield: 90% of the theoretical yield.

EXAMPLE 6

270 g. (3.3 moles) of phosphorous acid, 191 g. (1 mole) of nitrilo triacetic acid, and 650 cc. of acetic acid anhydride are mixed at room temperature. The mixture is heated in the water bath to about 90° C. while stirring. Stirring is continued at said temperature for about 45 minutes. After cooling, the resulting nitrilo tris-(methylene phosphonic acid) is filtered off by suction and is dried at about 120° C. Yield: 295 g.

In place of the α-amino carboxylic acids used as the one reactant in the process according to the present invention, there can be employed equimolecular amounts of other α-amino carboxylic acids such as glycine bis-(methylene phosphonic acid), imino diacetic acid mono-(methylene phosphonic acid), cyclohexane diamino tetraacetic acid, ethanolamino diacetic acid, 1,4-butylene diamino tetraacetic acid, 1,3-diamino propane tetraacetic acid, 1,2-diamino propane tetraacetic acid, methylimino diacetic acid, taurine-N,N-diacetic acid, and also polyalkylene amino polyacetic acids such as diethylene triamino pentaacetic acid, isophorone diamino tetraacetic acid, and others.

As shown in Examples 4 to 6, it is possible to mix the reactants in a different order than that described in Examples 1 to 3, namely (a) By preparing a mixture of phosphorus acid and the α-amino carboxylic acid compound at room temperature, heating the mixture to a temperature between about 90° C. and about 160° C. while stirring, and then adding the water-binding agent thereto, or (b) By mixing the three reactants, phosphorous acid, α-amine carboxylic acid compound, and water-binding agent at room temperature, while stirring, and then heating the mixture to the reaction temperature between about 90° C. and about 160° C.

As shown in Example 3, dilution of the sirupy reaction mixture with water to a water content of about 50% yields a solution, from which the phosphonic acid crystallizes on cooling.

Dilution of the reaction mixture so that a 25% or even less concentrated phosphonic acid solution is obtained, yields a solution from which the phosphonic acid does not crystallize. The resulting aqueous phosphonic acid solution can be used as such.

The resulting amino methylene phosphonic acids are excellent complexing or sequestering agents for polyvalent metal ions, such as calcium, magnesium, iron, and the like ions. They are added, for instance, to fluid cleaning agents because they are stable against hydrolysis. They have become of greatly increased value during the last few years because they have proved to be effective even when employed in sub-stoichiometric amounts.

We claim:
1. In a process of producing amino methylene phosphonic acids, the steps which comprise heating an α-amino carboxylic compound being substituted at its amino nitrogen atom, said compound being selected from the group consisting of ethylene diamino tetraacetic acid, nitrilo tri- acetic acid, glycine bis-(methylene phosphonic acid), sarcosine monomethylene phosphonic acid, imino diacetic acid mono-(methylene phosphonic acid), cyclohexane diamino tetraacetic acid, ethanolamino diacetic acid, 1,4-butylene diamino tetraacetic acid, 1,3-diamino propane tetraacetic acid, 1,2-diamino propane tetraacetic acid, methylimino diacetic acid, taurine-N,N-diacetic acid, polyalkalene amino polyacetic acids selected from the group consisting of diethylene triamino pentaacetic acid and isophorone diamino tetraacetic acid, and the alkali metal salts thereof, with phosphorous acid in the presence of a water-binding agent selected from the group consisting of lower alkanoic acid anhydrides, phosphorous pentoxide and concentrated sulfuric acid at a temperature between about 90° C. and about 160° C. to replace the carboxyl groups by phosphonic acid groups, and recovering the corresponding amino methylene phosphonic acid from the reaction mixture, the molecular amount of phosphorous acid in the reaction mixture being between one mole and three moles for each carboxyl group present in the $\alpha$-amino carboxylic acid compound and the molar amount of the water-binding agent being at least the stoichiometric amount required to combine with the water set free during the reaction or present in the reaction mixture.

2. The process of claim 1, in which the reaction temperature is between about 120° C. and about 140° C.

3. The process of claim 1, in which the water-binding agent is present in an amount being twice to three times the required stoichiometric amount.

4. The process of claim 1, in which the water-binding agent is a lower alkanoic acid anhydride.

5. The process of claim 4, in which the lower alkanoic acid anhydride is selected from the group consisting of acetic acid anhydride and propionic acid anhydride.

6. The process of claim 1, in which the water-binding agent is phosphorous pentoxide.

7. The process of claim 1, in which the water-binding agent is concentrated sulfuric acid.

8. The process of claim 1, in which the phosphorous acid is heated with stirring to a temperature of between about 90° C. and about 160° C., the $\alpha$-amino carboxylic acid compound is added portion by portion thereto at a temperature of between about 90° C. and about 160° C., while stirring, stirring is continued until foam formation due to carbon monoxide development ceases, the water-binding agent is added gradually to the reaction mixture at said temperature between about 90° C. and about 160° C., and the resulting reaction mixture is cooled to recover the amino methylene phosphonic acid formed thereby.

9. The process of claim 8, in which the reaction temperature is between about 120° C. and about 140° C.

10. The process of claim 8, in which the water-binding agent is present in an amount being twice or three times the required stoichiometric amount.

11. The process of claim 1, in which the phosphorous acid and the $\alpha$-amino carboxylic acid compound are mixed at room temperature and then are heated to the reaction temperature between about 90° C. and about 160° C., while stirring, whereupon the water-binding agent is added to the mixture at said temperature and the resulting reaction mixture is cooled to recover the amino methylene phosphonic acid formed thereby.

12. The process of claim 1, in which the phosphorous acid, the $\alpha$-amino carboxylic acid compound, and the water-binding agent are mixed at room temperature, the mixture is heated to the reaction temperature between about 90° C. and about 160° C., while stirring, and the resulting reaction mixture is cooled to recover the amino methylene phosphonic acid formed thereby.

13. The process of claim 1, wherein the $\alpha$-amino carboxylic acid compound is nitrilo triacetic acid.

14. The process of claim 1, wherein the $\alpha$-amino carboxylic acid compound is ethylene diamino tetraacetic acid.

References Cited

UNITED STATES PATENTS

| 3,288,846 | 11/1966 | Irani et al. | 260—502.5 |
| 3,567,768 | 3/1971 | Shen et al. | 260—502.5 |

FOREIGN PATENTS

| 1,142,294 | 2/1969 | Great Britain | 260—502.5 |

JOSEPH E. EVANS, Primary Examiner

U.S. Cl. X.R.

252—Dig. 11; 260—439 R

UNITED STATES PATENT AND TRADEMARK OFFICE
CERTIFICATE OF CORRECTION

PATENT NO. : 3,796,749
DATED : March 12, 1974
INVENTOR(S) : Friedrich KRUEGER; Lieselotte BAUER; and Walter MICHEL It is certified that error appears in the above-identified patent and that said Letters Patent are hereby corrected as shown below:

Cover page, column 1, in the line following "Appl. No. 255,022"

should appear:  -- Priority: June 30, 1971
Federal Republic of Germany
P 21 32 511.1 -- ;

Signed and Sealed this fourteenth Day of October 1975

[SEAL]

Attest:

RUTH C. MASON
*Attesting Officer*

C. MARSHALL DANN
*Commissioner of Patents and Trademarks*